(12) United States Patent
Tsukazaki et al.

(10) Patent No.: US 7,882,157 B2
(45) Date of Patent: Feb. 1, 2011

(54) CONTENT DATA RECORDING DEVICE AND RECORDING CONTROL METHOD

(75) Inventors: Hideo Tsukazaki, Tokyo (JP); Takashi Kinouchi, Tokyo (JP)

(73) Assignee: Sony Corporation, Tokyo (JP)

( * ) Notice: Subject to any disclaimer, the term of this patent is extended or adjusted under 35 U.S.C. 154(b) by 282 days.

(21) Appl. No.: 11/490,212

(22) Filed: Jul. 20, 2006

(65) Prior Publication Data
US 2007/0025198 A1  Feb. 1, 2007

(30) Foreign Application Priority Data
Jul. 26, 2005  (JP) .............................. 2005-215503

(51) Int. Cl.
G06F 7/00 (2006.01)
G06F 15/16 (2006.01)
G06F 13/00 (2006.01)
G06F 13/28 (2006.01)

(52) U.S. Cl. ........................ 707/812; 709/206; 711/113
(58) Field of Classification Search ...................... 707/1
See application file for complete search history.

(56) References Cited

U.S. PATENT DOCUMENTS

| | | | |
|---|---|---|---|
| 5,594,910 A * | 1/1997 | Filepp et al. | 712/28 |
| 6,253,237 B1 * | 6/2001 | Story et al. | 709/217 |
| 6,457,046 B1 * | 9/2002 | Munakata | 709/216 |
| 6,473,846 B1 * | 10/2002 | Melchior | 711/170 |
| 6,678,586 B2 * | 1/2004 | Nakamoto et al. | 701/1 |
| 2002/0016823 A1 * | 2/2002 | Ueno et al. | 709/206 |
| 2002/0169927 A1 * | 11/2002 | Takai | 711/119 |
| 2003/0037019 A1 * | 2/2003 | Nakamura | 707/1 |
| 2004/0003012 A1 * | 1/2004 | Lasken et al. | 707/205 |
| 2004/0054656 A1 * | 3/2004 | Leung et al. | 707/1 |
| 2004/0215597 A1 * | 10/2004 | Fitzgerald et al. | 707/1 |
| 2005/0071551 A1 * | 3/2005 | Miyamoto | 711/113 |
| 2005/0080762 A1 * | 4/2005 | Nakashima et al. | 707/1 |
| 2005/0160069 A1 * | 7/2005 | Park et al. | 707/1 |

FOREIGN PATENT DOCUMENTS

| | | |
|---|---|---|
| JP | 08-336172 A | 12/1996 |
| JP | 11-187446 A | 7/1999 |
| JP | 11-196180 A | 7/1999 |
| JP | 2000-209261 A | 7/2000 |
| JP | 2001-168875 A | 6/2001 |
| JP | 2002-135292 A | 5/2002 |

(Continued)

OTHER PUBLICATIONS

Keith Muller;A high performance multi-strctured file system design;1991; ACM; vol. 25, Issue 5; pp. 56-67.*

*Primary Examiner*—Neveen Abel Jalil
*Assistant Examiner*—Jermaine Mincey
(74) *Attorney, Agent, or Firm*—Wolf, Greenfield & Sacks, P.C.

(57) ABSTRACT

Electronic device capable of automatically securing a capacity for recording a second content data other than a first content data even in the case of automatically recording to a storage medium the first content data received by a push-type service. For example, a portable audio player receives as an input push-type data from a personal computer and stores the same in a HDD when there is a free storable region in its push-type-use storage capacity.

18 Claims, 13 Drawing Sheets

FOREIGN PATENT DOCUMENTS

| | | |
|---|---|---|
| JP | 2002-135293 A | 5/2002 |
| JP | 2002-146988 | 5/2002 |
| JP | 2002-323998 A | 8/2002 |
| JP | 2002-312394 A | 10/2002 |
| JP | 2003-069646 A | 3/2003 |
| JP | 2003-152583 A | 5/2003 |
| JP | 2003-219479 A | 7/2003 |
| JP | 2003-223394 A | 8/2003 |
| JP | 2003-248779 A | 9/2003 |
| JP | 2003-337735 A | 11/2003 |
| JP | 2004-166279 A | 6/2004 |
| JP | 2004-206014 A | 7/2004 |
| JP | 2004-213834 A | 7/2004 |
| JP | 2005-108017 A | 4/2005 |
| JP | 2005-165986 A | 6/2005 |
| JP | 2006-018538 A | 1/2006 |

* cited by examiner

FIG. 3

| MUSIC DATA ID | ARTIST ID | ALBUM ID | PUSH-TYPE ID | PULL-TYPE ID | DATA AMOUNT AD |
|---|---|---|---|---|---|
| M_D1 | AR_D1 | AL_D1 | PUS_D1 | ... | AD1 |
| M_D2 | AR_D1 | AL_D1 | PUS_D2 | ... | AD2 |
| M_D3 | AR_D2 | AL_D2 | ... | PUL_D1 | AD3 |
| M_D4 | AR_D3 | AL_D3 | ... | PUL_D2 | AD4 |
| M_D5 | AR_D4 | AL_D4 | PUS_D3 | ... | AD5 |
| ... | ... | ... | ... | ... | ... |

TABLE

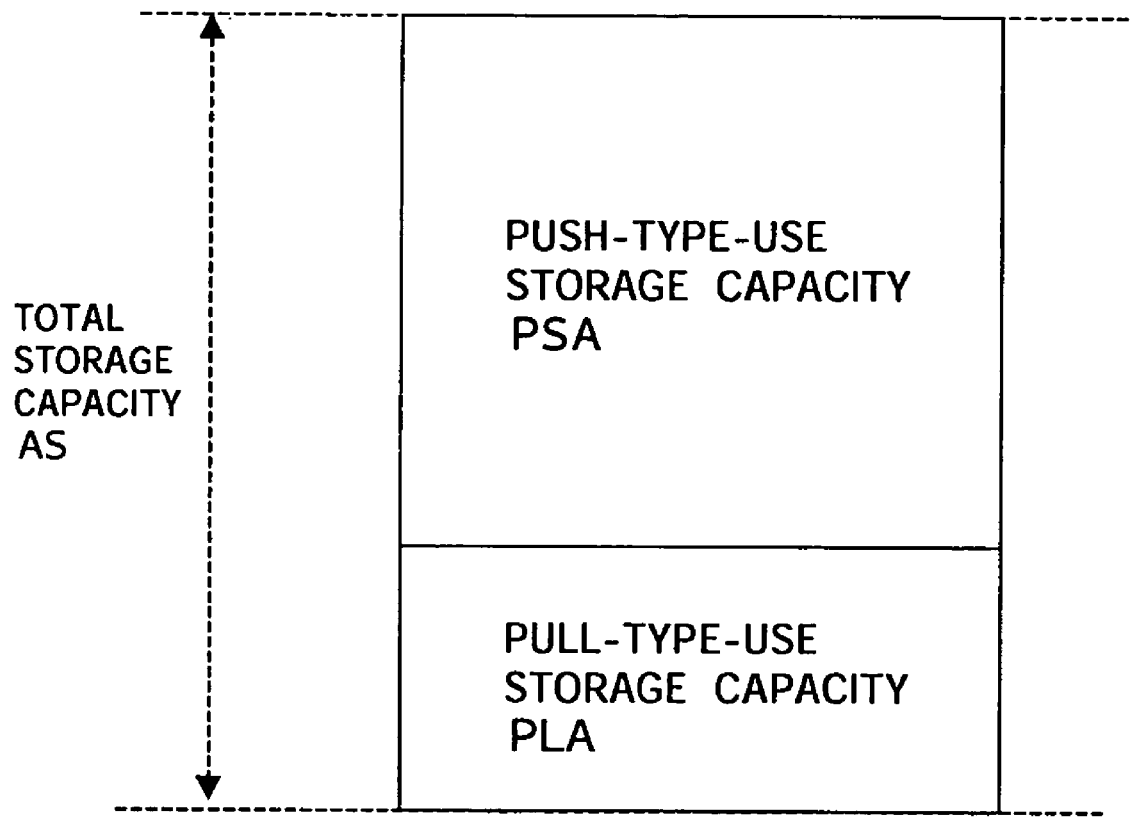

FIG. 5A
FIG. 5B
FIG. 5C
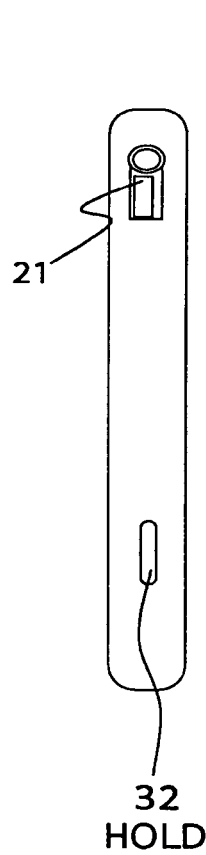
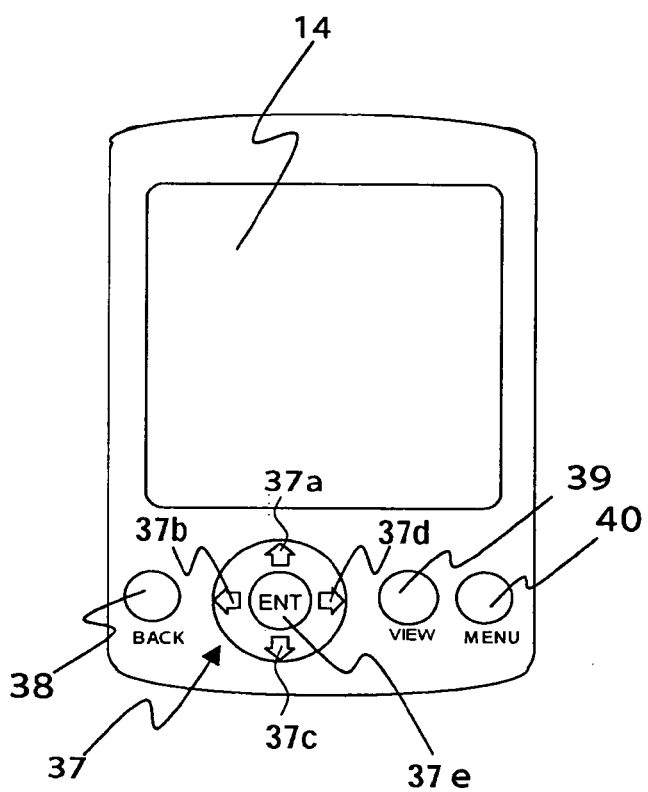
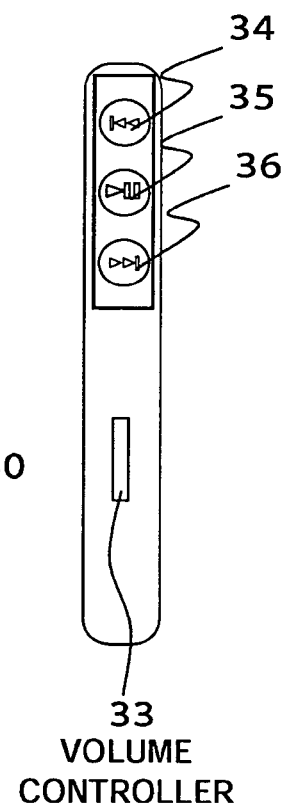

FIG. 11

| MUSIC DATA ID | ARTIST ID | ALBUM ID | PUSH-TYPE ID | PULL-TYPE ID | DATA AMOUNT AD |
|---|---|---|---|---|---|
| M_D1 | AR_D1 | AL_D1 | PUS_D1 | ... | AD1 |
| M_D2 | AR_D1 | AL_D1 | ... | PUL_D3 | AD2 |
| M_D3 | AR_D2 | AL_D2 | ... | PUL_D1 | AD3 |
| M_D4 | AR_D3 | AL_D3 | ... | PUL_D2 | AD4 |
| M_D5 | AR_D4 | AL_D4 | PUS_D3 | ... | AD5 |
| ... | ... | ... | ... | ... | ... |

TABLE

CONTENT DATA RECORDING DEVICE AND RECORDING CONTROL METHOD

CROSS REFERENCES TO RELATED APPLICATIONS

The present invention contains subject matter related to Japanese Patent Application JP 2005-215503 filed in the Japanese Patent Office on Jul. 26, 2005, the entire contents of which being incorporated herein by reference.

BACKGROUND OF THE INVENTION

1. Field of the Invention

The present invention relates to an electronic device (content data recording device) for controlling writing of content data to a recording medium, a recording control method, a program and a recording medium.

2. Description of the Related Art

In recent years, as a result of recording media becoming large in capacity and development of compression techniques of music, moving pictures and still images, etc., enormous number of music data can be stored in a recording medium of a portable audio player.

Such a portable audio player is connected, for example, to a personal computer, receives various music data from the personal computer and writes them to the recording medium.

The music data includes pull-type data, such as music data downloaded from a server expressly by the user by operating the personal computer and ripping data recorded from a CD, and push-type data downloaded to the personal computer by push-type distribution by a server, such as subscription data and demo music data (e.g. refer to Japanese Unexamined Patent Publication No. 2002-149688).

A portable audio player of the related art receives, for example, push-type data from the personal computer without limitation and records to the recording medium.

SUMMARY OF THE INVENTION

In the portable audio player as above, enormous push-type data is automatically written to the recording medium, and there is a disadvantage that the case where pull-type data input expressly by the user cannot be written may arise.

Players for receiving content data, such as video data, other than music data, recording the same in their recording media and playing also have the same disadvantage.

It is desired to provide a recording control method capable of automatically securing a recording capacity for recording second content data other than first content data given by push-type service in the recording medium even when automatically receiving the first content data and recording the same in the recording medium.

According to the present invention, there is provided a storage apparatus including: an interface configured to receive a first content data distributed by a push-type service, the second content data other than the first content data, a storage portion storable for the first and second content data input from the interface, and a control circuit configured to compare a data amount of the input content data with a predetermined storable capacity of the first content data when the content data input via the interface is the first content data, and store the input content data in the storage portion when the data amount of the input content data does not exceed the storable capacity of storing the first content data.

According to the present invention, there is provided a data storage method for controlling a writing of content data to a storage portion, including the steps of: judging a storable capacity of the first content data received by a push-type service and a storable capacity of the second content data other than the first content data in the storage portion, receiving the first and second content data, comparing a data amount of the received content data with a storable capacity of the first content data when the received content data is the first content data, and storing the received content data in the storage portion when the data amount of the received content data does not exceed the storable capacity of the first content data.

According to the present invention, there is provided a content data receiving system including a server for storing content data, a terminal for receiving the content data, and the server includes a storage portion storing content data, a distribution portion for performing push-type distribution of the content data to the terminal, and the terminal includes an interface for receiving the first content data given by push-type distribution and second content data other than the first content data, and a storage portion storable for storing content data input from the interface, a control circuit configured to compare a data amount of the input content data with a predetermined storable capacity of the first content data when receiving content data from the server by push-type distribution, and store the input content data in the storage portion when a data amount of the received content data does not exceed a storable capacity of the first content data.

According to the present invention, it is possible to provide an electronic device, a recording the control method, by which a recording capacity for recording the second content data can be secured in the storage portion even when the first content data by push-type service is automatically received and recorded in the storage portion.

BRIEF DESCRIPTION OF DRAWINGS

These and other objects and features of the present invention will become clearer from the following description of the preferred embodiments given with reference to the attached drawings, in which:

FIG. 3 is a view for explaining attributes assigned to music data stored in the portable audio player shown in FIG. 2;

FIG. 4 is a view for explaining management of a storage capacity of a HDD shown in FIG. 2;

FIG. 5 is an exterior view of the portable audio player shown in FIG. 2;

FIG. 11 is a view for explaining an update method of a management data "TABLE" shown in FIG. 3 in the operation shown in FIG. 10;

DESCRIPTION OF THE PREFERRED EMBODIMENT

Below, a portable audio player according to embodiments of the present invention will be explained.

First Embodiment

First, corresponding relationship of components of the present embodiment and those of the present invention will be explained.

Music data of the present embodiment is an example of content data of the present invention.

Push-type data "PUS" of the present embodiment is an example of first content data of the present invention, and pull-type data "PUL" is an example of second content data of the present invention.

Also, a push-type-use storage capacity "PSAS" of the present embodiment is an example of a first predetermined amount of the present invention, and a pull-type-use storage capacity "PLAS" is an example of a second predetermined amount of the present invention.

Figure 7:
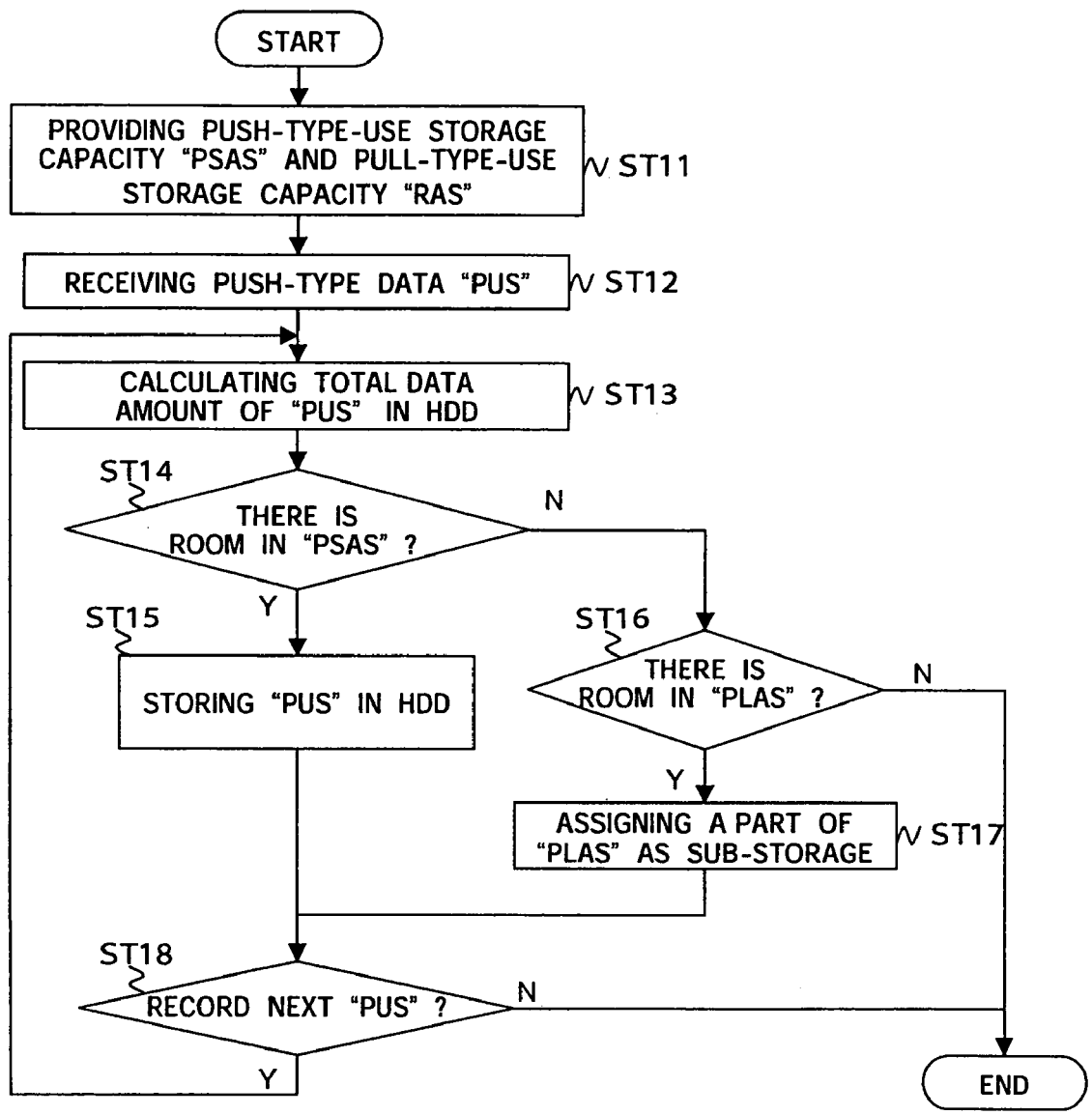
FIG. 7 is a flowchart for explaining an operation example of inputting push-type data "PUS" from a personal computer to the portable audio player shown in FIG. 2.

The step ST12 shown in FIG. 7 is an example of a first step of the first invention, the step ST14 is an example of the second step, and the step ST15 is an example of the third step.

Figure 2:
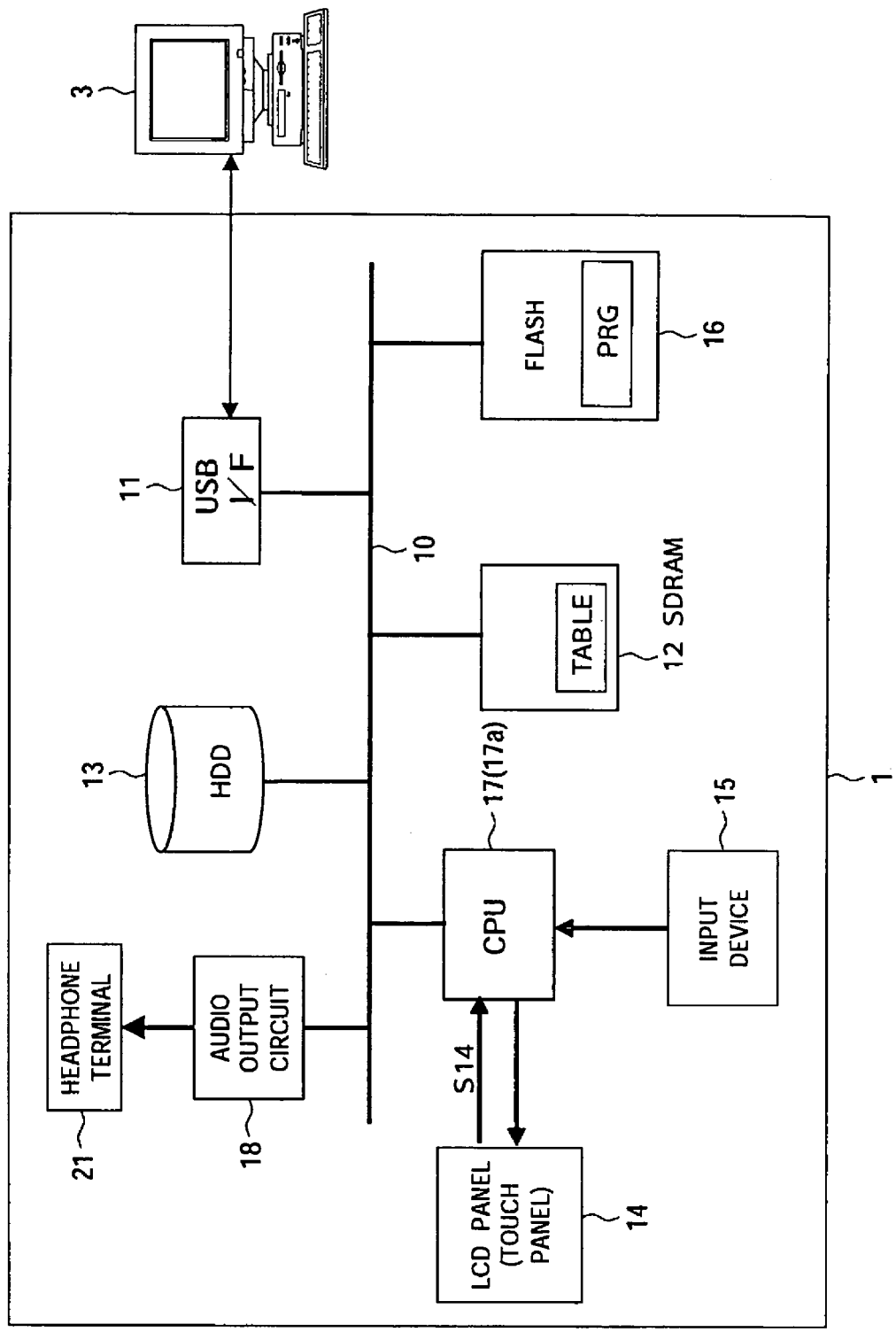
FIG. 2 is a view of the configuration of the portable audio player shown in FIG. 1.

The program "PRG" shown in FIG. 2 is an example of a program of the third invention.

The flash memory 16 shown in FIG. 2 is an example of a recording medium of the fourth invention and it may be an optical disk, magneto optical disk or other recording medium.

Figure 1:
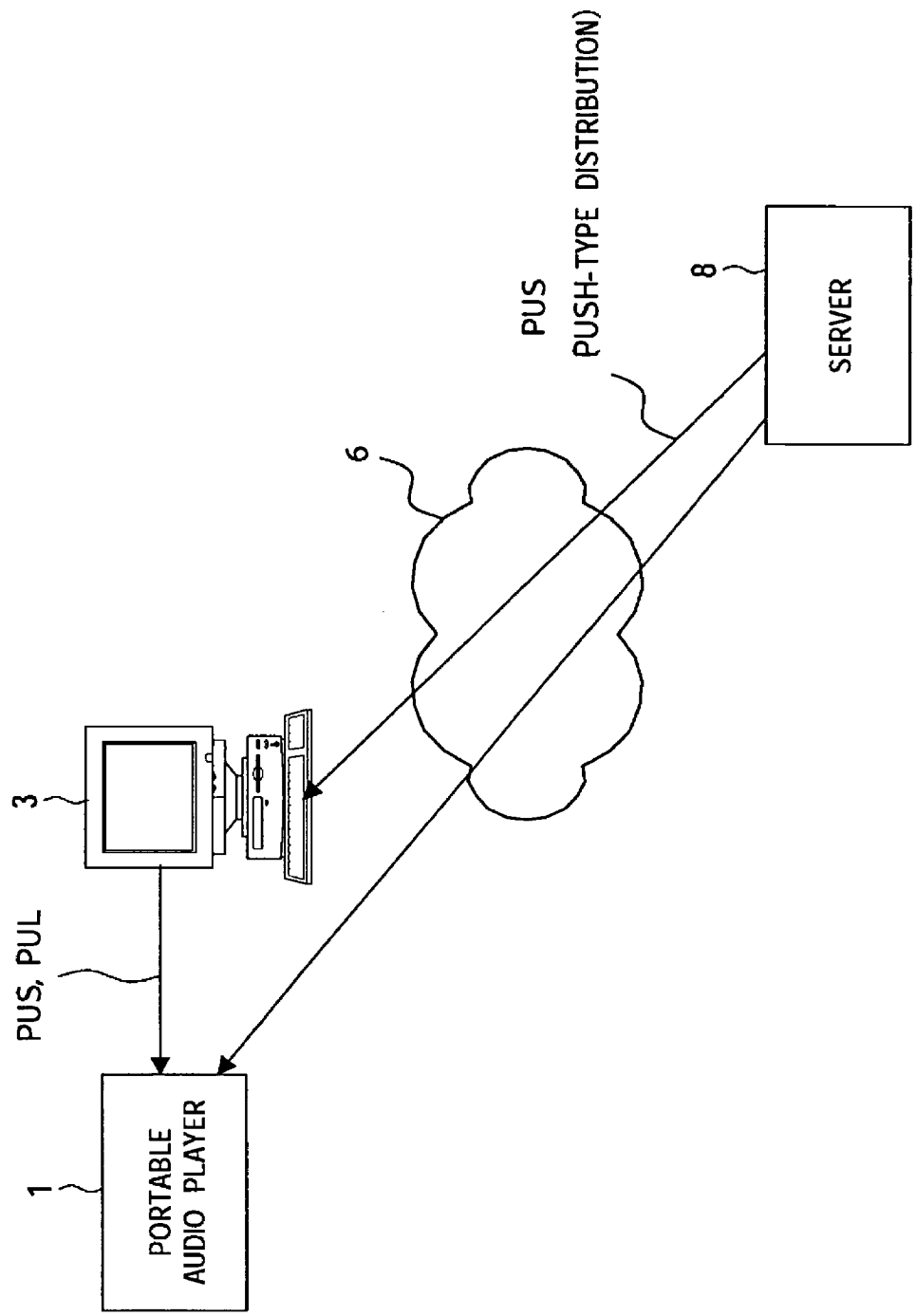
FIG. 1 is a view for explaining a system, to which a portable audio player according to an embodiment of the present invention is applied.

The HDD 13 shown in FIG. 1 is an example of a recording medium (storage portion) of the present invention, the USB interface 11 is an example of an interface of the present invention, and the CPU 17 is an example of a control circuit of the present invention.

Below, a portable audio player according to the embodiments of the present invention will be explained.

FIG. 1 is a view for explaining a system, to which a portable audio player 1 according to the embodiments of the present invention is applied.

As shown in FIG. 1, the personal computer 3 receives push-type data "PUS" as music data from the server 8 by "PUSH" distribution via the network 6.

Then, when the portable audio player 1 becomes able to communicate with the personal computer 3, pull-type data "PUL" as music data designated by a user of the portable audio player 1 and push-type data "PUS" stored in the personal computer 3 are input (received) from the personal computer 3.

The push-type data "PUS" is music data received or input by push-type distribution, which is music data that the user does not take any intentional proceeding in purchasement, etc. The push-type distribution is distribution to send information in a unilateral way on the server side without a request for the information by the terminal side.

In the present embodiment, the terminal is the portable audio player 1 and the server is the computer 3. Note that the server may be a server on a network and the terminal may be the computer 3.

The pull-type data "PUL" is music data input to the portable audio player 1 in response to an instruction by the user and subscription data through a user's action (demand) of purchase, etc.

In the present embodiment, music data other than the push-type data "PUS" is assumed as pull-type data "PUL". When the portable audio player 1 has a wireless LAN function, music data of push distribution by the server 8 may be directly received.

FIG. 2 is a view of the configuration of the portable audio player 1 shown in FIG. 1.

As shown in FIG. 2, the portable audio player 1 includes, for example, a USB (universal serial bus) interface 11, an SDRAM (synchronous DRAM) 12, a HDD (hard disk drive) 13, an LCD (liquid crystal display) panel 14, an input device 15, a flash memory 16, a CPU (central processing unit) 17 and an audio output circuit 18.

The USB interface 11, the SDRAM 12, the HDD 13, the flash memory 16, the CPU 17 and the audio output circuit 18 are connected, for example, via a data line 10.

The USB interface 11 is connected to the personal computer 3 and exchange data with the personal computer 3.

The USB interface 11 in a state of being connected to the personal computer 3 receives as an input push-type data "PUS" and pull-type data "PUL" as compressed music data from the personal computer 3.

The SDRAM 12 temporarily stores data relating to processing of the CPU 17, etc.

The HDD 13 stores music data input to the USB interface 11.

The HDD 13 has a storage capacity of, for example, 60 GB and capable of storing music data of about 30000 songs (as much as 700 compact disks) compressed by ATRAC (adaptive transform acoustic coding) 3, etc.

Each music data stored in the HDD 13 (hereinafter, also simply referred to as music data) is made to be corresponding to an ID thereof, an ID of an artist, an ID of an album, a push-type ID, a pull-type ID and a data amount "AD" by a management data "TABLE" as shown in FIG. 3.

The management data "TABLLE" is stored in the HDD 13 and read out to the SDRAM 12, for example, at the time of activating the portable audio player 1.

When the music data is push-type data "PUS", the push-type ID indicates the fact (identification).

When the music data is pull-type data "PUL", the pull-type ID indicates the fact (identification).

The data amount "AD" indicates a data amount of the music data.

In the present embodiment, as shown in FIG. 4, by being controlled by the CPU 17, the storage capacity of the HDD 13 is managed by being divided to push-type-use storage capacity "PSAS" for storing push-type data "PUS" and the pull-type-use storage capacity "PLAS" for storing pull-type data "PUL". In the present embodiment, 40 GB is assigned as the push-type-use storage capacity "PSAS" and 20 GB is assigned as the pull-type-use storage capacity "PLAS" in the total storage capacity of 60 GB of the HDD 13.

Namely, as will be explained later on, the CPU 17 writes push-type data "PUS" input via the USB interface 11 to the HDD 13 in the case where a total data amount of the push-type data "PUS" stored in the HDD 13 does not exceed the push-type-use storage capacity "PSAS" by the writing to the HDD 13.

In the portable audio player 1, a large amount of push-type data "PUS" is written to the HDD 13 and the events occur that the user cannot write pull-type data "PUL" to the HDD 13 is prevented.

The LCD panel 14 is provided on the front of the chasses of the portable audio player 1 as shown in FIG. 5B.

On the LCD panel 14, various screen pages are displayed by the CPU 17.

As main screen pages displayed on the LCD panel 14, there are, for example, a menu screen, a music selection screen, a setting screen and a reproduction screen, etc. and the screen pages are switched (shifted) in response to key operations by the user.

Also, the LCD panel 14 is a touch panel and detects a position touched by a finger, etc. by the user on the screen and outputs a detection position signal S14 indicating the position to the CPU 17.

The LCD panel 14 may be, for example, an organic EL (electroluminescence) display.

The input device 15 is, as shown in FIG. 5A to FIG. 5C, provided on the chasses of the portable audio player 1 and is a various keys operated by the user.

Also, the input device 15 inputs data by a touch panel function of the LCD panel 14.

As shown in FIG. 5A, one side surface of the portable audio player 1 is provided with a headphone terminal 21 and a "HOLD" key 32.

As shown in FIG. 5B, the front surface of the portable audio player 1 is provided with the LCD panel 14, a "BACK" key 38, a cross-shaped key 37, a "VIEW" key 39 and a "MENU" key 40.

The cross-shaped key 37 includes an upper cross key 37a for moving a cursor on the screen, a left cross key 37b for moving the cursor to the left of the screen (a lower hierarchy), a lower cross key 37c for moving the cursor downward on the screen, a right cross key 37d for moving the cursor to the right on the screen (a higher hierarchy), and a cross determination key 37e for inputting a determination instruction of a reproduction instruction, etc.

As shown in FIG. 5C, the other side surface of the portable audio player 1 is provided with a fast rewind key 34, a play/stop key 35, a fast-forward key 36 and a volume control dial 33.

The flash memory 16 stores, for example, a program for performing operations of the CPU 17.

The audio output circuit 18 outputs an audio signal in accordance with music data decoded by the CPU 17 to the headphone terminal 21.

The CPU 17 integrally controls operations of the portable audio player 1, which will be explained in the present embodiment, based on the program "PRG" read from the flash memory 16.

Also, the CPU 17 reads selected music data from the HDD 13, decodes the same and outputs the result to the audio output circuit 18.

Figure 6:
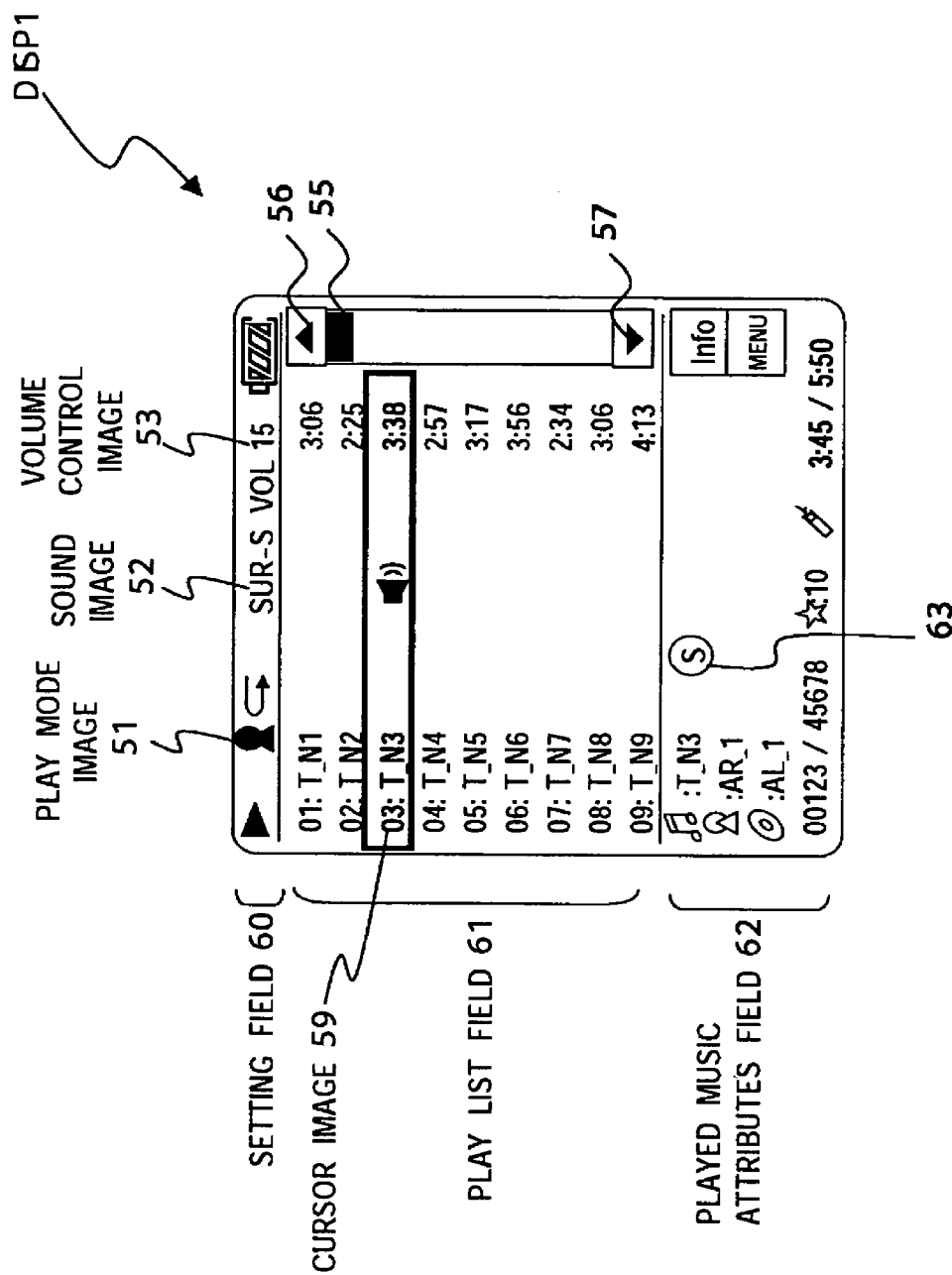
FIG. 6 is a view for explaining a reproduction screen displayed on an LCD panel shown in FIG. 2.

The CPU 17 displays, for example, the play screen "DISP1" shown in FIG. 6 on the LCD panel 14.

As shown in FIG. 6, the play screen "DISP1" has, for example, a setting field 60, the play list field 61 and a reproduction (play) music attributes field 62.

As shown in FIG. 6, the setting field 60 includes, for example, a reproduction (play) mode image 51, a sound image 52 and a volume control image 53.

The reproduction mode image 51 is, for example, an image indicating a designated reproduction mode. As the reproduction mode, for example, an artist reproduction mode, an album reproduction mode and a shuffle reproduction mode, etc. may be mentioned.

The sound image 52 is an image indicating a designated sound. In the present embodiment, for example, normal, pops, jazz, studio, live, etc. can be designated.

The volume control image 53 is an image indicating designated volume.

The play list field 61 displays (arranges) title data of a plurality of music data selected as a reproduction (play) object in order in a designated reproduction mode.

Also, the play list field 61 displays play time data of each music data corresponding to the title data.

A cursor image 59 is displayed on title data and play time data of music data played at the moment on the play list field 61.

Also, the play list field 61 has a function button image 56 for moving the cursor image 59 upward on the screen, a function button image 57 for moving the cursor image 59 downward on the screen, and a function button image 55 for moving the cursor image 59 by dragging.

When there are a larger number of music data to be played than a predetermined number, the CPU 17 displays on the play list field 61 titles of a predetermined number of music data in a play order before and after the music data being reproduced (played) at the time.

The reproduced (played) music attributes field 62 displays title data, artist name data and album name data of music data being reproduced (played) at the time.

Also, when the music data being reproduced (played) at the time is push-type data "PUS", the reproduction (play) music attributes field 62 displays a mark 64 indicating the fact.

The CPU 17 controls to write to the HDD 13 push-type data "PUS" and pull-type data "PUL" input from the personal computer 3 via the USB interface 11.

The CPU 17 controls the writing so as to prevent the situation that pull-type data "PUL" input from the personal computer 3 via the USB interface 11 cannot be written to the HDD 13 due to push-type data "PUS" stored in the HDD 13.

The writing control will be explained in detail in operation examples of the portable audio player 1 explained below.

Below, operation examples of the portable audio player 1 shown in FIG. 1 will be explained.

First Operation Example

In the present operation example, the case of inputting push-type data "PUS" to the portable audio player 1 from the personal computer 3 will be explained.

FIG. 7 is a flowchart for explaining the operation example.

Step ST11:

The CPU 17 provides, as shown in FIG. 4, the push-type-use storage capacity "PSAS" for storing push-type data "PUS" and the pull-type-use storage capacity "PLAS" for storing pull-type data "PUL" in the storage capacity of the HDD 13.

At this time, the CPU 17 provides the push-type-use storage capacity "PSAS" and the pull-type-use storage capacity "PLAS", for example, based on an instruction signal from the input device 15 in response to a user's operation.

Step ST12:

The USB interface 11 and the personal computer 3 come to a communicationable state, and push-type data "PUS" is input from the personal computer 3 via the USB interface 11.

The USB interface 11 comes to a communicationable state with the personal computer 3 by wired or wireless connection. Also, the USB interface 11 comes to a disconnected state with the personal computer 3, for example, when the user carries the portable audio player 1.

The CPU 17 judges whether music data, for example, input from the personal computer 3 is push type data "PUS" or pull-type data "PUL" based on header data of the music data.

Step ST13:

The CPU 17 calculates a total data amount of push-type data "PUS" stored in the HDD 13, for example, based on the management data "TABLE" shown in FIG. 3.

Step ST14:

The CPU 17 judges whether or not the total data amount of the push-type data "PUS" stored in the HDD 13 exceeds the push-type storage capacity "PSAS" when the push-type data "PUS" received in the step ST12 is stored in the HDD 13 based on the push-type storage capacity "PSAS" judged in the step ST11, and an amount of the push-type data "PUS" received in the step ST12 and the total data amount calculated in the step ST13.

When it is judged whether or not exceeding, the CPU 17 judges that there is a free storable region in the push-type-use storage capacity "PSAS" and proceeds to a step ST15, while when judged exceeding, proceeds to a step ST16.

Step ST15:

The CPU 17 writes the push-type data "PUS" input in the step ST12 to a not-recorded region in the HDD 13.

Note that, when the push-type space for storing push-type data "PUS" and the pull-type space for storing pull-type data "PUL" are provided in advance the proceeding in the step ST11, the CPU 17 writes the push-type data to a not-recorded region in the push-type space in the HDD 13.

Step ST16:

The CPU 17 judges whether or not the pull-type-use storage capacity "PSAS" has a free storable region for storing the push-type data "PUS" based on a total data amount of the pull-type data "PUL" stored in the HDD 13, the pull-type-use storage capacity "PLAS" judged in the step ST11, and a data amount of the push-type data "PUS" received in the step ST12; proceeds to a step ST17 when judged to have a free storable region and, while otherwise, finishes the processing (namely, the push-type data "PUS" is not written to the HDD 13).

The CPU 17 judges whether or not that there is a free storable region when a sum of the total data amount of the pull-type data "PUL" and the data amount of the push-type data "PUS" received in the step ST12 does not exceed the pull-type-use storage capacity "PLAS".

Step ST17:

The CPU 17 writes the push-type data "PUS" input in the step ST12 to the HDD 13.

Figure 8:
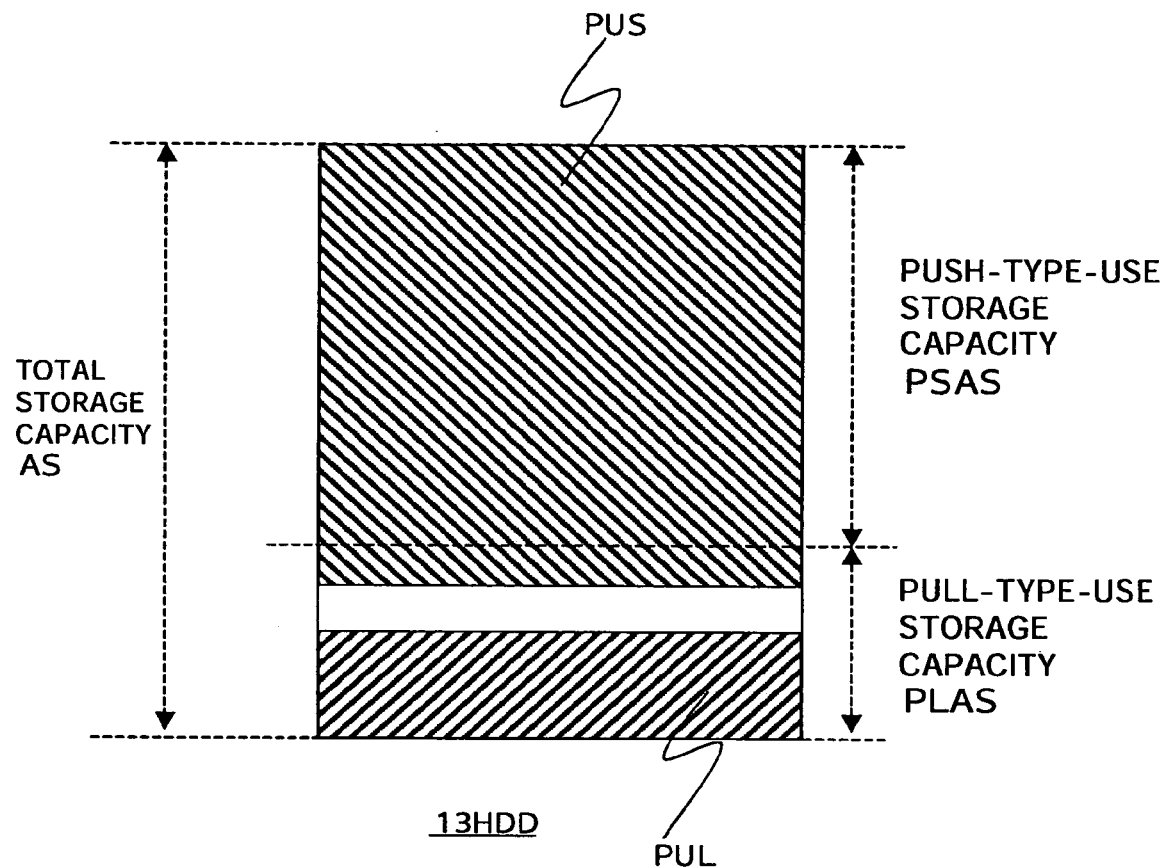
FIG. 8 is a view for explaining a method of using a storage capacity of a HDD in the operation example shown in FIG. 7.

Namely, as shown in FIG. 8, a part of the pull-type-use storage capacity "PLAS" is used to write the push-type data "PUS" to the HDD 13.

Step ST18:

The CPU 17 judges whether there is push-type data "PUS" to be written to the HDD 13 next or not and, when judged that there is, returns back to the step ST13, while not, finishes the processing.

Second Operation Example

In the present operation example, the case of inputting pull-type data "PUL" to the portable audio player 1 from the personal computer 3 will be explained.

Figure 9:
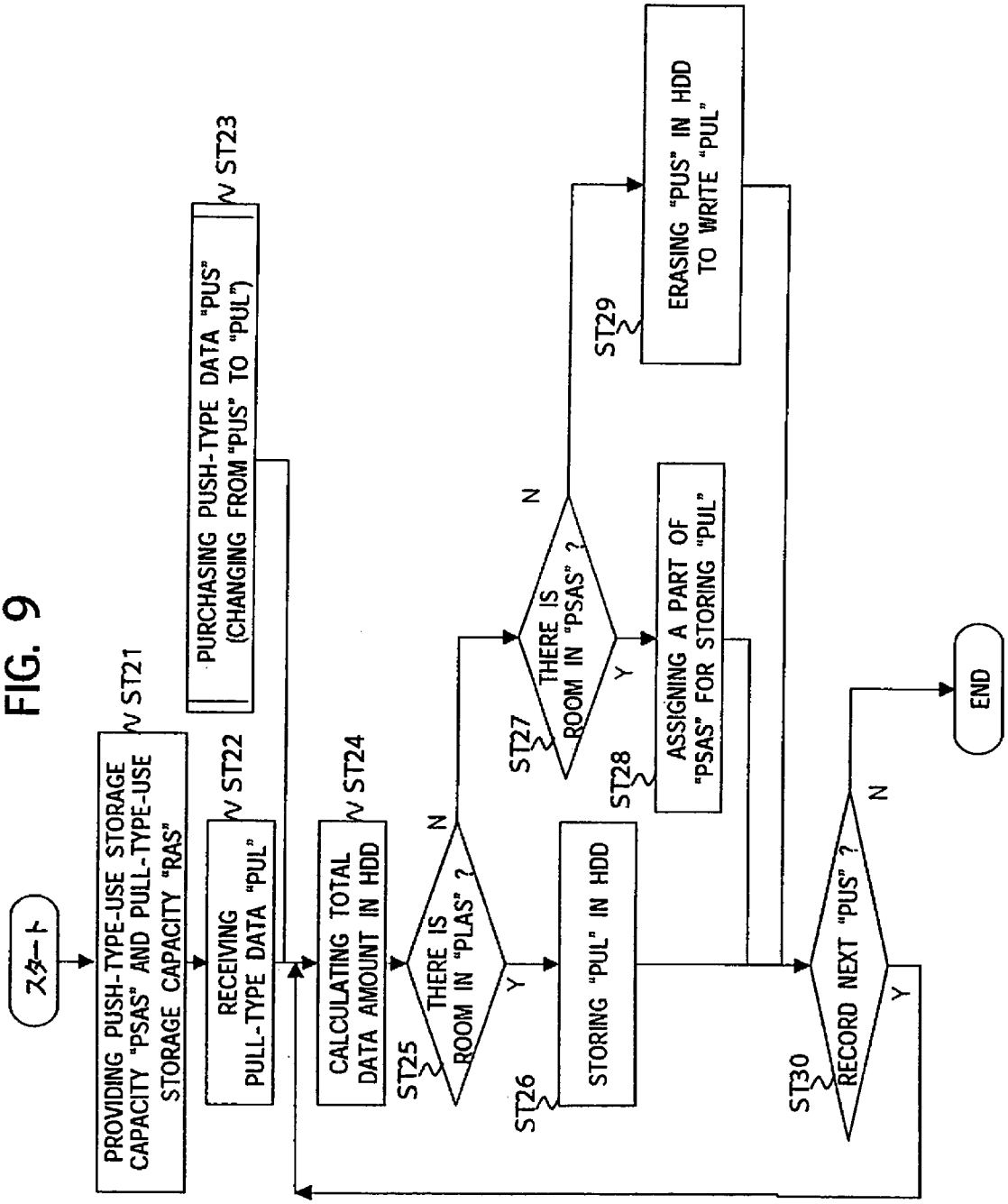
FIG. 9 is a flowchart for explaining an operation example of inputting pull-type data "PUL" from a personal computer to the portable audio player shown in FIG. 2.

FIG. 9 is a flowchart for explaining the operation example.

Step ST21:

The CPU 17 provides, as shown in FIG. 4, the push-type-use storage capacity "PSAS" for storing the push-type data "PUS" and the pull-type-use storage capacity "PLAS" for storing pull-type data "PUL" in the storage capacity of the HDD 13.

At this time, the CPU 17 provides the push-type-use storage capacity "PSAS" and the pull-type-use storage capacity "PLAS", for example, based on an instruction signal from the input device 15 in response to a user's operation.

Note that the CPU 17 does not perform the processing in the ST21 when the step ST11 shown in FIG. 7 is completed.

Step ST22:

The USB interface 11 and the personal computer 3 come to a communicationable state, and pull-type data "PUL" is input (received) from the personal computer 3 via the USB interface 11.

The CPU 17 judges whether music data, for example, input from the personal computer 3 is push type data "PUS" or pull-type data "PUL" based on header data of the music data.

Step ST23:

For example, when the user makes a purchase of push-type data "PUS" written in the HDD 13 by following the above procedure shown in FIG. 7, the CPU 17 changes the push-type data "PUS" to pull-type data "PUL".

The CPU 17 deletes the push-type ID of the purchased data and gives the pull-type ID in the management data "TABLE" shown in FIG. 3.

Figure 10:
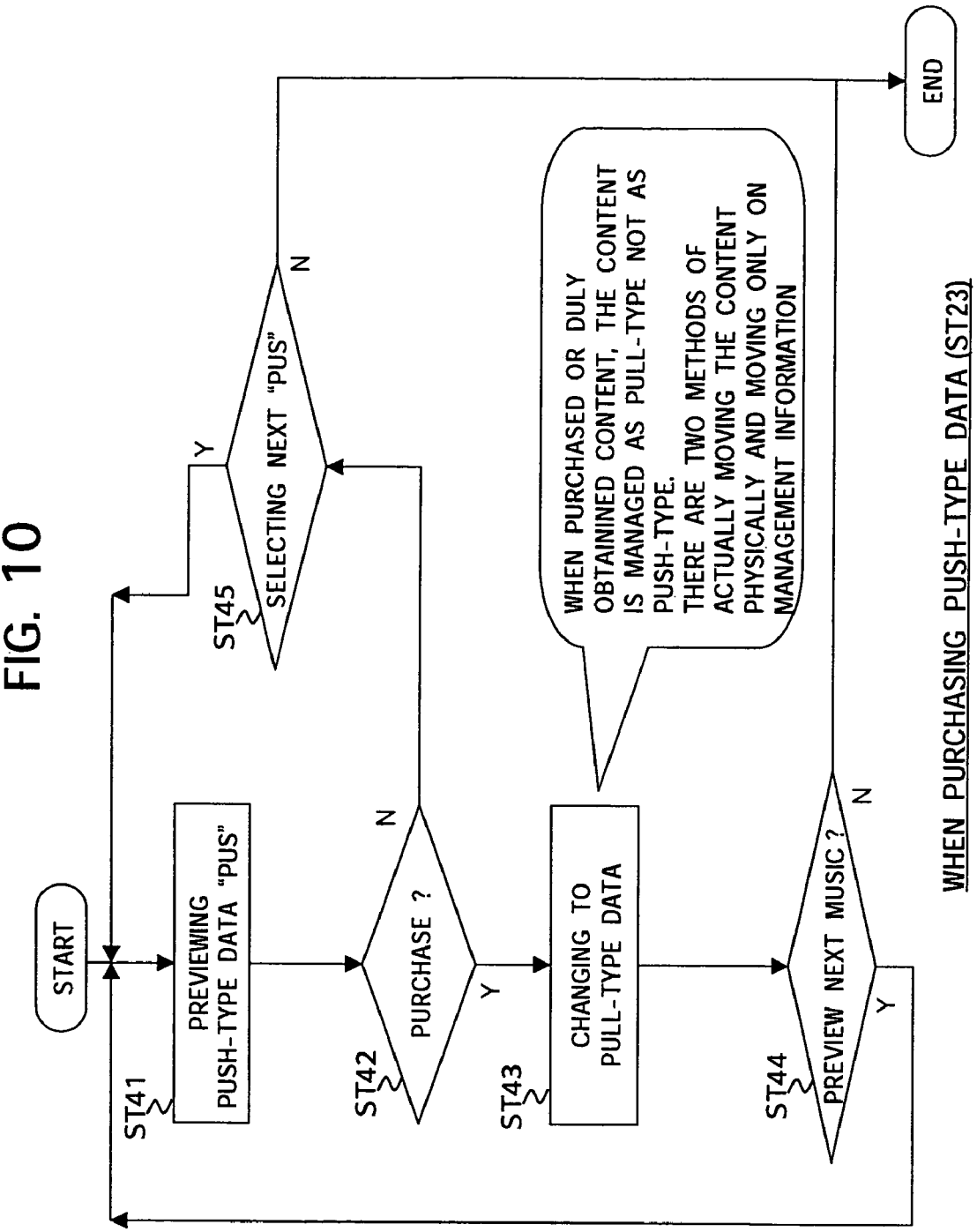
FIG. 10 is a flowchart for explaining processing in the step ST23 shown in FIG. 9.

The CPU 17 changes from push-type data "PUS" to pull-type data "PUL", for example, based on the procedure shown in FIG. 10.

Namely, the CPU 17 previews the push-type data "PUS" based on an operation signal in response to a user's operation from the input device 15 (Step ST41).

When it is judged that an instruction for purchase is input by the user based on the operation signal from the input device 15 (Step ST42), the CPU 17 changes the previewed push-type data "PUS" to pull-type data "PUL" (Step ST43).

When the user purchases music data "M_ID2" shown in FIG. 3, the CPU 17 deletes a push-type ID of the music data "M_ID2" and gives a pull-type ID "PUL_ID3".

On the other hand, when the user does not purchase the previewed push-type data "PUS" or when the change process as above is completed (Steps ST44 and ST45), the CPU 17 previews the next push-type data "PUS".

Step ST24:

The CPU 17 calculates a total data amount of pull-type data "PUL" stored in the HDD 13, for example, based on the management data "TABLE" shown in FIG. 3.

Step ST25:

The CPU 17 judges whether or not the total data amount of the pull-type data "PUL" stored in the HDD 13 exceeds the pull-type-use storage capacity "PLAS" when the pull-type data "PUL" received in the step ST22 is stored in the HDD 13 based on the pull-type-use storage capacity "PLAS" judged in the step ST21, a data amount of the pull-type data "PUL" received in the step ST22 and the total data amount calculated in the step ST24.

When it is judged not exceeding, the CPU 17 judges that there is a free storable region in the pull-type-use storage capacity "PLAS" and proceeds to a step ST26, while when judged exceeding, proceeds to a step ST27.

Step ST26:

The CPU 17 writes the pull-type data "PUL" input in the step ST22 or changed in the ST23 to the HDD 13.

Step ST27:

The CPU 17 judges whether or not the push-type-use storage capacity "PLAS" has a free storable region for storing the pull-type data "PUL" based on a total data amount of the push-type data "PUS" stored in the HDD 13, the push-type-use storage capacity "PSAS" judged in the step ST21, and a data amount of pull-type data "PUL" received in the step ST22; proceeds to a step ST28 when judged to have a free storable region and, while otherwise, proceeds to a step ST29.

Step ST28:

The CPU 17 writes the pull-type data "PUL" input in the step ST22 or changed in the step ST23 to the HDD 13.

Figure 12:
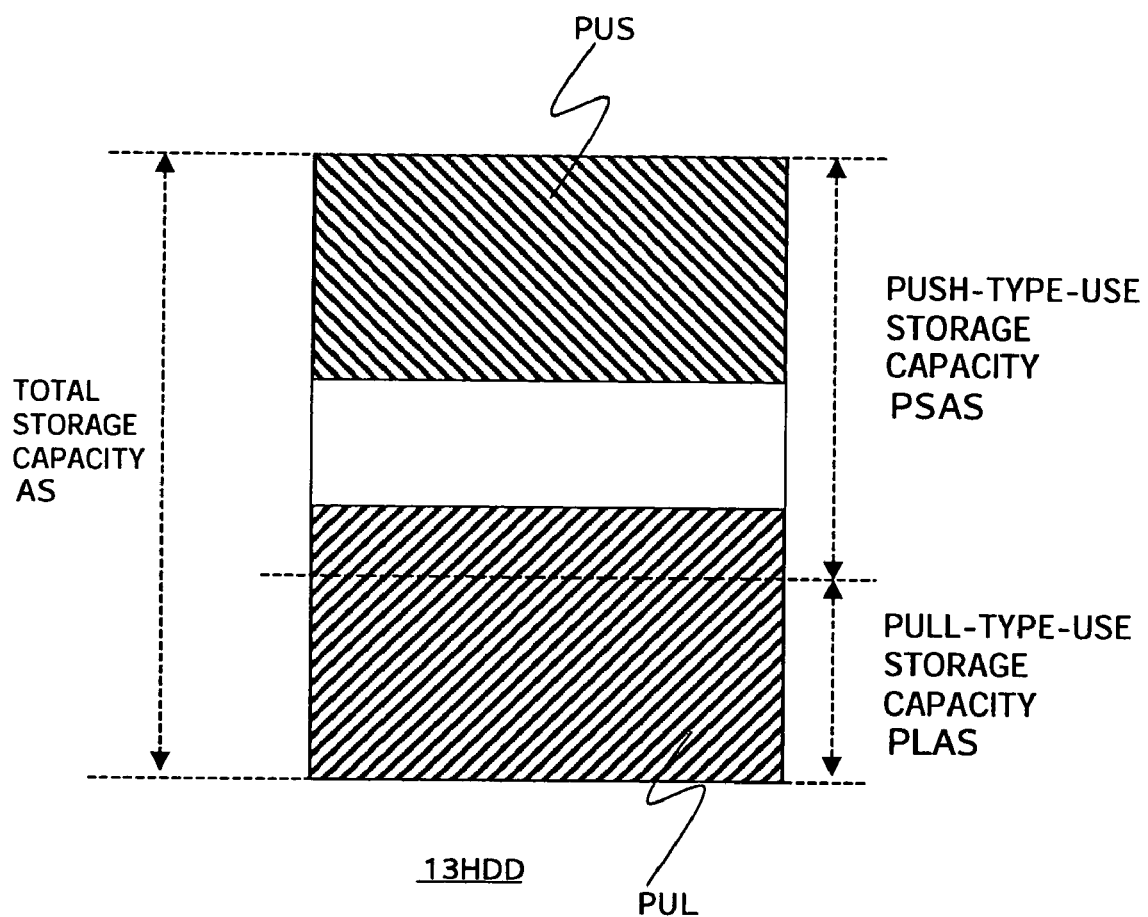
FIG. 12 is a view for explaining a method of using a storage capacity of the HDD in the operation example shown in FIG. 9.

Namely, as shown in FIG. 12, a part of the push-type-use storage capacity "PSAS" is used to write the pull-type data "PUL" to the HDD 13.

Step ST29:

The CPU 17 deletes a larger amount of push-type data "PUS" than at least a data amount of the pull-type data "PUL" received in the step ST22 in the push-type data "PUS" stored in the HDD 13.

The CPU 17 deletes the push-type data "PUS", for example, in an order from ones with older date and time of being input to the portable audio player 1.

After the deleting, the CPU 17 writes the pull-type data "PUL" input in the step ST22 or changed in the step ST23 to the HDD 13.

Step ST30:

The CPU 17 judges whether there is pull-type data "PUL" to be written to the HDD 13 next or not and, when it is judged there is, returns back to the step ST24, while otherwise, finishes the processing.

According to the portable audio player 1, as explained with reference to FIG. 7, push-type data "PUS" is written to the HDD 13 only when there is a free storable region in the push-type-use storage capacity "PSAS" and when there is a free storable region in the pull-type-use storage capacity "PLAS".

As a result, a data amount of push-type data "PUS" stored in the HDD 13 can be limited.

Alternately, according to the portable audio player 1, as explained with reference to FIG. 9, etc., even when there is not a free storable region for writing pull-type data "PUL" in the HDD 13, the pull-type data "PUL" can be written to the HDD 13 by using a part of the push-type-use storage capacity "PSAS" and deleting push-type data "PUS". As a result, the situation that pull-type data "PUL" cannot be written to the HDD 13 can be prevented.

Second Embodiment

A portable audio player of the present embodiment is the same as the portable audio player 1 of the first embodiment except for a part of writing processing of push-type data "PUS" to the HDD 13 shown in FIG. 7.

Figure 13:
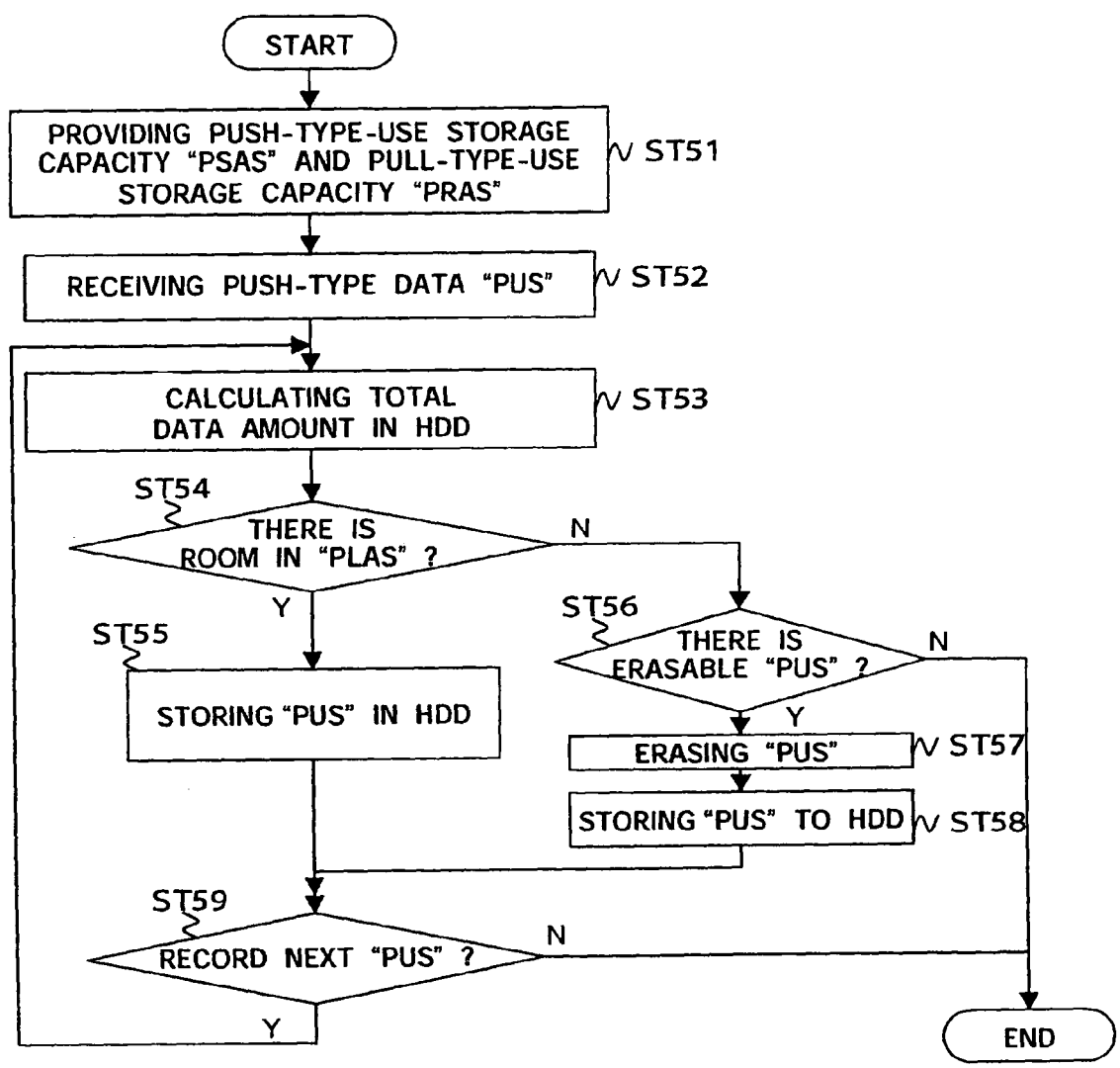
FIG. 13 is a flowchart for explaining a write operation of push-type data by a portable audio player in a second embodiment of the present invention.

FIG. 13 is a flowchart for explaining a write operation of push-type data by a portable audio player of the present embodiment.

Steps ST51 to ST55 and ST59 shown in FIG. 13 are the same as the steps ST11 to ST15 and ST18 shown in FIG. 7, respectively.

Below, steps ST 56 to ST58 shown in FIG. 13 will be explained.

When the CPU 17a judges that there is not a free storable region in the push-type-use storage capacity "PSAS" in the step ST 54, the procedure proceeds to a step ST 56.

Step ST56:

The CPU 17a judges whether or not there is data ready for being deleted in push-type data "PUS" stored in the HDD 13 and, when judged there is, proceeds to a step ST57, while not, finishes the processing (the push-type data "PUS" input in the step ST52 is not written to the HDD 13).

Step ST57:

The CPU 17a deletes the push-type data judged to be deletable in the step ST56 from the HDD 13.

Step ST58:

The CPU 17a writes the push-type data "PUS" received in the step ST52 to a recording space cleared in the step ST57.

According to the portable audio player of the present embodiment, it is possible to suppress recording of push-type data "PUS" in the push-type-use storage capacity "PSAS" provided in advance in the HDD 13.

As a result, according to the portable audio player of the present embodiment, when writing pull-type data "PUL" to the HDD 13, the number of times of performing the operation of deleting push-type data "PUS" can be reduced comparing with that in the first embodiment and the processing time can be reduced.

The present invention is not limited to the above embodiments.

It should be understood by those skilled in the art that various modifications, combinations, sub-combinations and alternations may occur depending on design requirements and other factors insofar as they are within the scope of the appended claims or the equivalents thereof.

In the above embodiments, the case where the memory space of the HDD 13 was not physically divided to a push-type space for storing push-type data "PUS" and a pull-type space for storing pull-type data "PUL" was explained as an example, but the spaces may be physically divided for management.

Also, in the above embodiments, the case where push-type data "PUS" distributed by the server 8 shown in FIG. 1 was input to the portable audio player 1 via the personal computer 3 was explained as an example, but the portable audio player 1 may directly receive from the server 8.

Also, in the above embodiments, the case of applying the present invention to a portable audio player was explained as an example, but the present invention may be applied to a personal computer or other devices than portable ones.

Also, in the above embodiments, audio data, such as music data, was explained as an example of content data of the present invention, but it may be videos, pictures and other image data.

Also, in the present invention, instead of the HDD 13 shown in FIG. 1, an MD (registered trademark) and other magneto-optical recording media, CD-R (CD-recordable), DVD-R (DVD-recordable) and other optical recording media, Memory Stick (registered trademark), SD Card (registered trademark) and other semiconductor memories, etc. may be used as the recording medium for storing content data.

Also, the present invention may be applied to a personal computer, an optical disk player and magneto-optical (MO) disk player, etc.

What is claimed is:

1. A storage apparatus comprising:
an interface configured to receive content data comprising a first content data that is subscription service content data distributed by a push-type service and a second content data that is user content data;
a storage portion to store the first content data and the second content data input from the interface, the storage portion having a total storage capacity, the total storage capacity being allocated as at least a first predetermined storable capacity for storing the first content data and a second predetermined storable capacity for storing the second content data such that the subscription service content data does not fill the storage portion and prevent storage of the user content data; and
a control circuit configured to compare, when the content data input via the interface is first content data, a data amount of the content data input via the interface with the first predetermined storable capacity of the first content data and to store the content data in the storage portion when the data amount of the content data does not exceed the first predetermined storable capacity of the first content data;

wherein, when the content data is the second content data and the data amount of the content data exceeds the second predetermined storable capacity of the second content data, the first predetermined storable capacity of the first content data is examined and, when there is not a free storable region in a storable capacity of the first content data, at least some previously-stored first content data is deleted to store the content data.

2. The storage apparatus as set forth in claim 1, wherein, when the content data input via the interface is the first content data, the control circuit compares a total sum of a data amount of previously-stored first content data and the data amount of the content data input to the first predetermined storable capacity of the first content data, and, when the total sum does not exceed the first predetermined storable capacity of the first content data, the content circuit stores the input content data in the storage portion.

3. The storage apparatus as set forth in claim 1, wherein the control circuit determines whether the content data input via the interface is the first content data or the second content data received from the push-type service, and when the content data is the first content data:
compares the data amount of the content data with the first predetermined storable capacity of the first content data, and
stores the content data in the storage portion when the data amount of the content data does not exceed the first predetermined storable capacity of the first content data, and when the content data is the second content data:
compares the data amount of the content data with the second predetermined storable capacity of the second content data, and
stores the content data in the storage portion when the data capacity of the content data does not exceed the second predetermined storable capacity of the second content data.

4. The storage apparatus as set forth in claim 1, wherein, when the content data comprises the first content data and the data amount of the content data exceeds the first predetermined storable capacity of the first content data, the control circuit examines the second predetermined storable capacity of the second content data and, when there is a free storable region in the second predetermined storable capacity of the second content data, stores the content data in the storage portion.

5. The storage apparatus as set forth in claim 1, wherein, when the content data is the second content data and the data amount of the content data exceeds the second predetermined storable capacity of the second content data, the control circuit examines the first predetermined storable capacity of the first content data and, when there is a free storable region in the storable capacity of the first content data, stores the content data in the storage portion.

6. A storage apparatus as set forth in claim 5, wherein, when the content data comprises the second content data and the data amount of the content data exceeds the second predetermined storable capacity of the second content data, the first predetermined storable capacity of the first content data is examined and, when there is not a free storable region in the first predetermined storable capacity of the first content data, deletable first content data is selected from the first content data already stored in the storage portion, and after deleting the deletable first content data, the content data is stored.

7. The storage apparatus as set forth in claim 6, wherein, when there is not a free storable region in the first predetermined storable capacity of the first content data, the control circuit determines whether or not to delete based on header information of the first content data already stored in the storage portion.

8. The storage apparatus as set forth in claim 1, further comprising a memory storing management data for managing data amounts of the first content data and the second content data stored in the storage portion; and wherein the control circuit judges whether or not the data amount of the content data exceeds the first predetermined storable capacity of the first content data based on the management data.

9. The storage apparatus as set forth in claim 1, wherein the control circuit changes the first content data stored in the storage portion to second content data.

10. The storage apparatus as set forth in claim 9, wherein, when processing of purchasing first content data is performed by a user, the control circuit changes the first content data under the purchase processing to the second content data.

11. The storage apparatus as set forth in claim 1, wherein, the second content data comprises a content data purchased by a user.

12. A data storage method for controlling a writing of a content data to a storage portion comprising:

determining a first predetermined storable capacity of a first content data received by a push-type service and a second predetermined storable capacity of a second content data other than the first content data in the storage portion;

receiving content data;

when the received content data is first content data:
comparing a data amount of the received content data with the first predetermined storable capacity of the first content data when the received content data is the first content data; and
storing the received content data in the storage portion when storing the data amount of the received content data would not exceed the first predetermined storable capacity of the first content data; and when the received content data is second content data:
comparing the data amount of the received content data with the second predetermined storable capacity of the second content data;
when storing the data amount of the received content data would not exceed the second predetermined storable capacity of the second content data, storing the received content data; and
when storing the data amount of the received content data would exceed the second predetermined storable capacity of the second content data:
determining whether the data amount of the received content data is equal to or less than an amount of free space in the first predetermined storable capacity for storing the first content data, and
storing the received content data in the storage portion when the data amount is equal to or less than the amount of free space in the first predetermined storable capacity.

13. The data storage method as set forth in claim 12, further comprising:

determining the first predetermined storable capacity of the first content data received from the push-type service and the second predetermined storable capacity of the second content data other than the first content data in the storage portion;

receiving content data;

comparing a total sum of a total data capacity of the first content data already stored in the storage portion and the data amount of the received content data with the first predetermined storable capacity of the first content data when the received content data is the first content data; and storing the received content data in the storage portion when the total sum does not exceed the first predetermined storable capacity of storing the first content data.

14. The data storage method as set forth in claim 12, further comprising:

when the received content data is the first content data and storing the data amount of the received content data would exceed the first predetermined storable capacity of the first content data:

determining whether the data amount of the received content data is equal to or less than an amount of free space in the second predetermined storable capacity for storing the second content data; and storing the received content data in the storage portion when the data amount is less than or equal to the amount of free space in the second predetermined storable capacity.

15. The data storage method as set forth in claim 12, further comprising:

when the received content data is second content data, the data amount of the received content data would exceed the second predetermined storable capacity, and the data amount is not equal to or less than the amount of free space in the first predetermined storable capacity:

deleting first content data already stored in the storage portion; and storing the received content data.

16. The data storage method as set forth in claim 12, further comprising:

when the received content data is second content data, the data amount of the received content data would exceed the second predetermined storable capacity, and the data amount is not equal to or less than the amount of free space in the first predetermined storable capacity:

selecting deletable first content data from the first content data already stored in the storage portion;

deleting the deletable first content data; and storing the received content data.

17. The data storage method as set forth in claim 16, further comprising:

determining whether to delete based on header information of the first content data already stored in the storage portion when there is no free storable region in the first predetermined storable capacity of the first content data.

18. A content data receiving system comprising;

a server to store a service library of service content data, a computer device storing a user library of user content data, the computer device being connected to the server via a network; and a terminal to receive content data from the computer device, wherein the server comprises:

a server storage medium to store the service content data, and a distribution interface to perform push-type distribution of the service content data to the computer device over the network;

the computer device comprises:

a device storage medium to store the user content data, and a receiver interface to receive at least some of the service content data from the server over the network via the push-type distribution, a transmitter interface to transmit content data that is at least one of user content data and service content data to the terminal; and the terminal comprises:

a terminal interface to receive, via the transmitter interface of the computer device, a first content data given by push-type distribution from the server and a second content data that is the user content data;

a terminal storage portion to store content data input from the interface, the terminal storage portion having a total storage capacity, the total storage capacity being allocated as at least a first predetermined storable capacity for storing the first content data and a second predetermined storable capacity for storing the second content data; and a control circuit configured to compare a data amount of the content data with a first predetermined storable capacity of the first content data when receiving content data from the server by push-type distribution, and store the content data in the terminal storage portion when a data amount of the received content data does not exceed the first predetermined storable capacity of the first content data.

* * * * *